(12) United States Patent
Sakai

(10) Patent No.: US 6,935,684 B2
(45) Date of Patent: Aug. 30, 2005

(54) OCCUPANT PROTECTING DEVICE

(75) Inventor: Katsuyuki Sakai, Hikone, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/453,553

(22) Filed: Jun. 4, 2003

(65) Prior Publication Data

US 2003/0222490 A1 Dec. 4, 2003

(30) Foreign Application Priority Data

Jun. 4, 2002 (JP) ........................................ 2002-163190

(51) Int. Cl.$^7$ ............................................... B60N 2/42
(52) U.S. Cl. ..................................................... 297/216.1
(58) Field of Search ........................ 297/216.1, DIG. 3, 297/284.11; 280/730.1

(56) References Cited

U.S. PATENT DOCUMENTS

| | | |
|---|---|---|
| 3,853,334 A | 12/1974 | Auman et al. |
| 5,340,185 A | 8/1994 | Vollmer |
| 5,695,242 A | 12/1997 | Brantman et al. |
| 6,050,635 A | 4/2000 | Pajon et al. |
| 6,296,292 B1 * | 10/2001 | Feldman |
| 6,450,573 B1 | 9/2002 | Yamaguchi et al. |
| 2001/0011810 A1 | 8/2001 | Saiguchi et al. |
| 2003/0052519 A1 * | 3/2003 | Reynolds et al. |

FOREIGN PATENT DOCUMENTS

| | | |
|---|---|---|
| DE | 199 43 595 A1 | 3/2001 |
| FR | 2 791 018 A1 | 9/2000 |
| GB | 2 284 393 A | 6/1995 |
| JP | 60-240535 A | 11/1985 |
| JP | 01-275230 A | 11/1989 |
| JP | 07-081466 A | 3/1993 |
| JP | 10-217818 A | 8/1998 |
| JP | 2001-239872 A | 9/2001 |
| JP | 2002-079861 A | 3/2002 |
| JP | 2002-079862 A | 3/2002 |
| JP | 2002-079863 A | 3/2002 |
| WO | WO 98/41426 A1 | 9/1998 |
| WO | WO 99/30922 A1 | 6/1999 |
| WO | WO 01/45978 A1 | 6/2001 |

* cited by examiner

Primary Examiner—Milton Nelson, Jr.
(74) Attorney, Agent, or Firm—Foley & Lardner LLP

(57) ABSTRACT

To provide an occupant protecting device in which a bag placed at the front of a seat cushion is inflated to locally and sufficiently push up or sufficiently harden the front of the seat cushion in order to prevent the forward movement of the waist of an occupant. An inflatable tube is placed under the front of a cushion pad. Gas is introduced from an inflator into the tube. A cover is provided to overlie the tube. The cover is pushed up when the tube is inflated. The cover tapers toward the top.

10 Claims, 4 Drawing Sheets

OCCUPANT PROTECTING DEVICE

BACKGROUND OF THE INVENTION

The present invention relates to an occupant protecting device for protecting an occupant on the seat of a vehicle, such as an automobile, in a collision, and particularly, to an occupant protecting device that prevents the body of the occupant from moving forward in a head-on collision.

Occupant protecting devices include systems for protecting the occupant of an automobile in a collision in which the front of a seat cushion is raised in a car collision in order to prevent a submarine phenomenon in which the occupant that wears a seat belt slips through a lap belt in a head-on collision.

Japanese Unexamined Patent Application Publication No. 7-81466 (incorporated by reference herein) discloses an occupant protecting device which has a bag placed under the front of a seat cushion and a plate placed on the bag and in which the plate is pushed up by the bag when the bag is inflated, as shown in FIGS. 3(a) and 3(b) of the present application. FIGS. 3(a) and 3(b) show the configuration of the occupant protecting device in JP7-81466. A floor 5 of a seat cushion 4 has a recess 6 formed slightly offset forward from the waist H of an occupant, and an air bag module 7 is installed inside the recess 6. The upper side of the recess 6 is covered with a plate 9 that can open in front on a rear hinge 8.

The air bag module 7 installed in the recess 6 has therein an air bag 7a in a folded state. The air bag module 7 is connected to a sensor provided in a strategic point of the car body. When the air bag module 7 receives a signal from the sensor, it operates a gas generator to deploy and inflate the air bag 7a upward.

As shown in FIG. 3(b), when the air bag 7a deploys and inflates upward, the plate 9 is lifted. Since the plate 9 is fixed at its rear end by the hinge 8, it is brought into a fixed front-open inclined state by being lifted by the air bag 7a. Therefore, the plate 9 in the inclined state enters the lower portion of the seat cushion 4, and increases the density of the seat cushion 4 to harden the seat cushion 4, thereby restraining the waist H of the occupant from moving forward.

In the above described occupant protecting device disclosed in Japanese Unexamined Patent Application Publication No. 7-81466, the plate 9 is substantially flat. As a result, the plate 9 receives an extremely large reactive force from the seat cushion 4 when the air bag 7a inflates and pushes up the plate 9. Therefore, in order to provide for proper operation of the device it is necessary to provide a high-power gas generator which achieves high gas pressure sufficient to overcome the reactive force from the cushion 4.

SUMMARY OF THE INVENTION

The present invention relates to an occupant protecting device which includes a bag placed inside or under the front of a seat cushion, and a cover overlying the bag, and in which the plate is pushed up by the bag when the bag is inflated.

At least one of the objects of the present invention is to provide an occupant protecting device in which a bag smoothly pushes up a cover for the bag even when a low-power gas generator is used.

An occupant protecting device of the present invention includes a seat having a seat cushion and a seat back, an inflatable bag placed inside or under the front of the seat cushion, a gas generator for inflating the bag in case of a vehicle emergency, and a cover placed on the upper side of the bag to be pushed upward by the bag when the bag is inflated, wherein the cover tapers such that the width thereof in the forward/rearward direction of the seat decreases toward the top.

In the occupant protecting device having such a configuration, in case of an emergency, such as a vehicle collision, the gas generator operates to inflate the bag, the cover is pushed up, and the front of the seat cushion is pushed up or a portion of the seat cushion in contact with the bag is compressed and hardened by being pressed from below, so that a submarine phenomenon of the occupant is prevented.

In the present invention, since the cover tapers toward the top, it receives a small reactive force from the seat cushion. Accordingly, the cover can be smoothly pushed up even with a low-power gas generator.

It is preferable that the cover be substantially trapezoidal, substantially semicircular, or substantially semi-elliptical in longitudinal cross section along the forward/rearward direction of the seat. When being pushed up, the cover having such a shape receives a sufficiently small reactive force from the seat cushion.

Since the upper end of the cover is not pointed, it will not crack the seat cushion, and this makes it easy to repair the seat of the automobile after the collision.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1A:
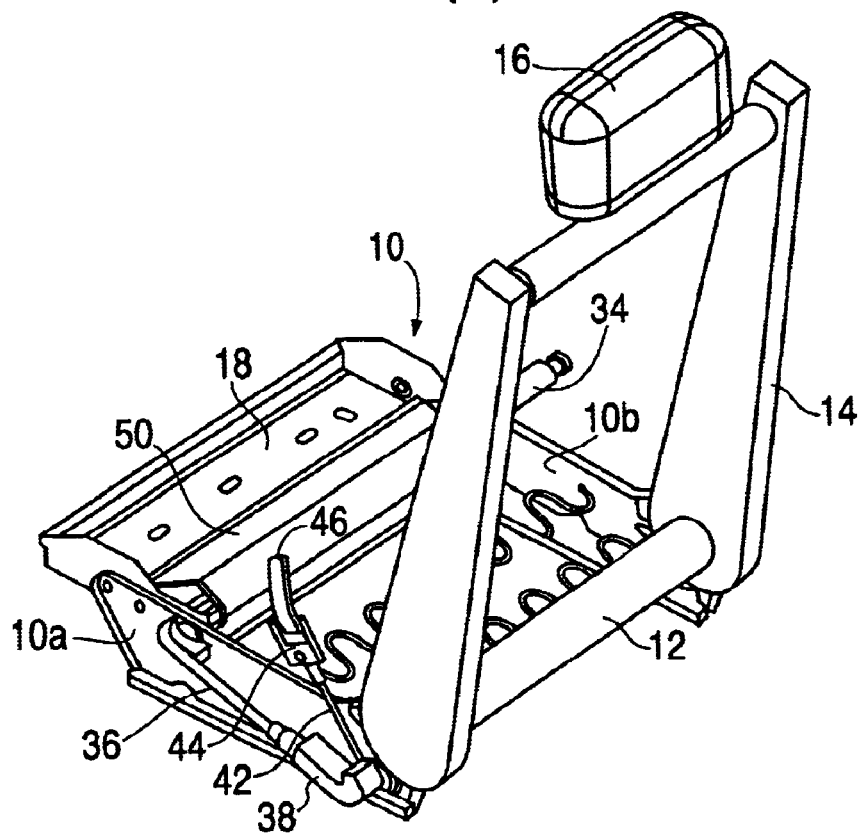
FIGS. 1(a) and 1(b) are perspective views of a frame of a seat equipped with an occupant protecting device of an embodiment.
Figure 1B:
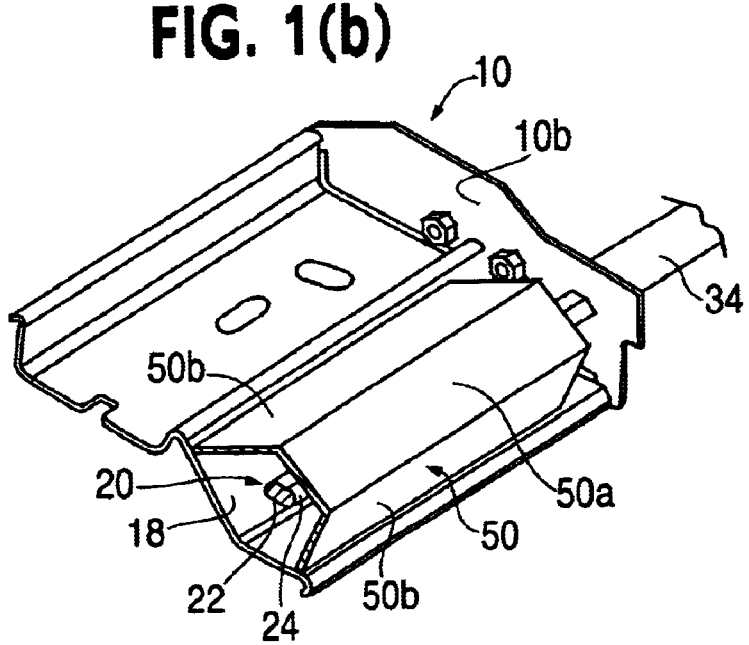
Figure 2A:
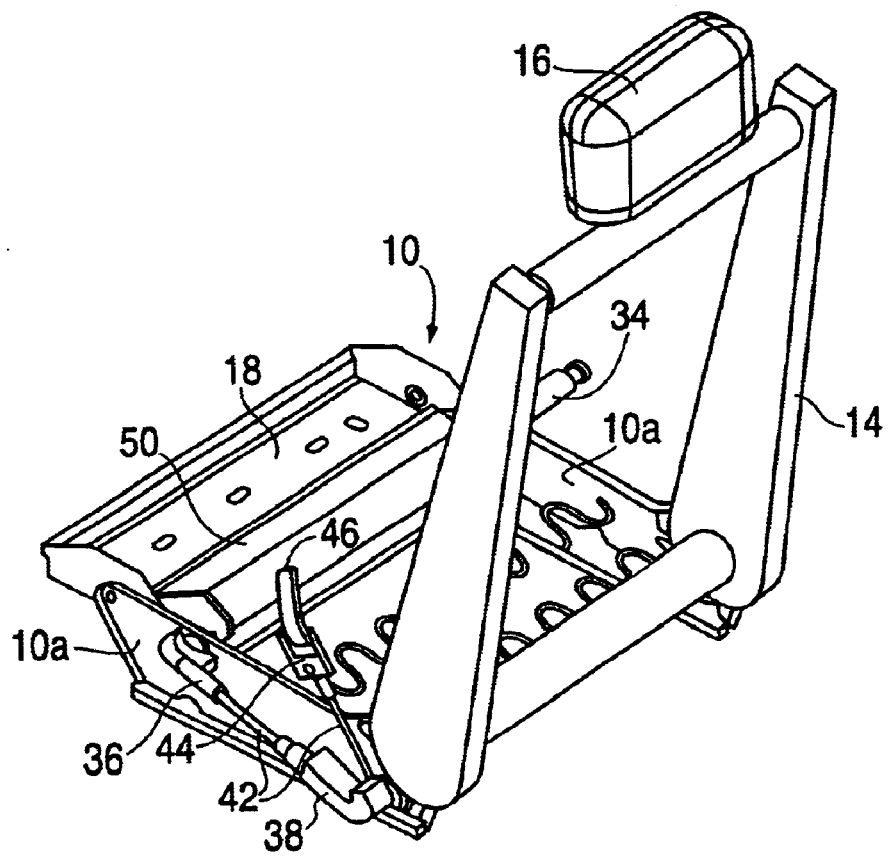
FIGS. 2(a) and 2(b) are structural views showing a state in which a bag shown in FIGS. 1(a) and 1(b) is inflated.
Figure 2B:
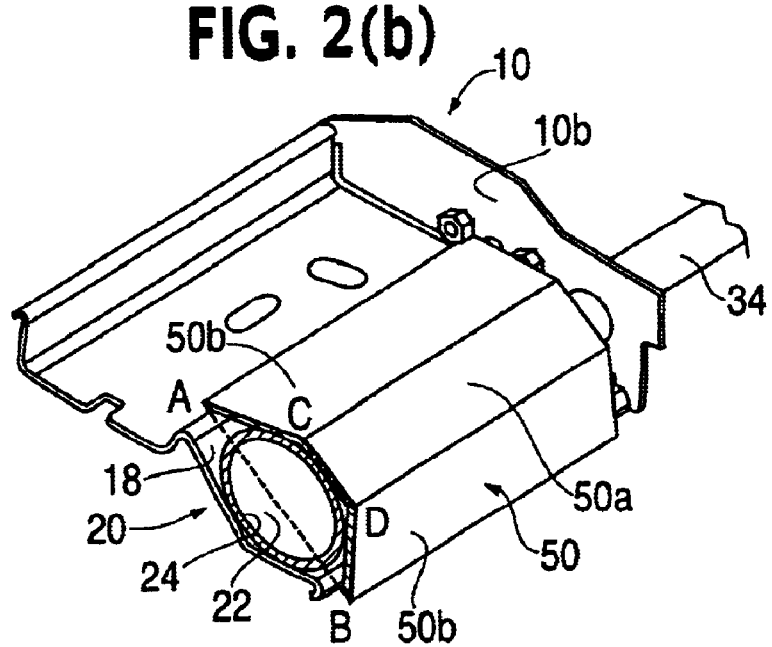

An embodiment will be described below with reference to the drawings. FIG. 1(a) is a perspective view of a frame of a seat equipped with an occupant protecting device according to an embodiment of the present invention, FIG. 1(b) is an enlarged partial view of the frame shown in FIG. 1(a), FIG. 2(a) is a perspective view showing a state in which an inflator of the occupant protecting device is operated, and FIG. 2(b) is an enlarged partial view showing the state shown in FIG. 2(a).

A frame that constitutes a seat of an automobile includes a base frame 10, and a back frame 14 pivotally connected to the base frame 10 through a support shaft 12 and a reclining device. A head rest 16 is mounted at the top of the back frame 14.

The base frame 10 includes left and right side frames 10a and 10b, a seat pan 18 laid between the fronts of the side frames 10a and 10b. The seat shown in FIG. 1(a) includes a seat cushion and back pad such as, for example, the seat cushion 4 and back pad shown in FIGS. 3(a) and 3(b). The top of the seat cushion presents a seating surface for the occupant of the vehicle.

An inflatable tube (hereinafter sometimes simply referred to a tube) 20 extends in the widthwise direction of the seat on the upper side of the seat pan 18 and between the side frames 10a and 10b.

The tube 20 includes a tubular bag 22, and a tubular mesh webbing 24 that surrounds the bag 22. The bag 22 is formed of an elongated folding member. The mesh webbing 24 is made of a knit fabric that can freely stretch in the radial direction, but hardly stretches in the longitudinal direction (the side-to-side direction of the seat).

One end of the tube 20 is connected to the side frame 10b. An inflator (gas generator) 34 is connected to the end of the tube 20. The inflator 34 is supported on the side frame 10b. The opposite end of the tube 20 is placed just close to the side frame 10a. A tensioning member 36 is connected to the other end of the tube 20.

The tensioning member 36 is made of a flexible material, is led outside through the side frame 10a, and extends rearward outside the side frame 10a. One end of a wire 42 is connected to the rear end of the tensioning member 36. The wire 42 extends upward through a wire guide member 38 that is placed in the rear of the side frame 10a. The other end (upper end) of the wire 42 is connected to a lap anchor 44. A seat belt (lap belt) 46 is connected to the lap anchor 44.

A cover 50 overlies the tube 20. The cover 50 extends lengthwise in a direction across the seat generally perpendicular to the forward direction of the vehicle. The cover is tapered from the top to the bottom so that the width of the cover gradually increases from the top to the bottom. The cover has a width measured along a line extending in the forward direction of the vehicle substantially parallel to the seating surface. The cover is configured so that a measurement of the width of the cover increases as the distance from the seating surface increases. For example, as shown in FIG. 2(b) the length of a line between points A and B is greater than the length of line between points C and D.

According to the embodiment shown in FIGS. 1(a)–2(b), the cover 50 includes an upper surface 50a and front and rear inclined surfaces 50b. The cover 50 is generally trapezoidal in longitudinal cross section along the forward/rearward direction of the seat. The lowers ends of the inclined surfaces 50b are in contact with the upper surface of the seat pan 18.

As mentioned above, a seat cushion pad and a back pad made of urethane or the like are attached to the base frame 10 and the back frame 14. The cover 50 and the tube 20 are placed under the cushion pad. The cover 50 is in contact with the lower surface of the cushion pad, and is lightly pressed from above. The top surface of the cushion pad, may be covered by upholstery, and presents a seating surface of the occupant of the vehicle.

Next, the operation of the occupant protecting device will be described. When a head-on collision of the automobile is detected, the inflator 34 starts to emit gas, the gas is introduced into the bag 22, and the tube 20 is inflated, as shown in FIGS. 2(a) and (b). The cover 50 is thereby pushed up by the tube 20. As a result, the front of the cushion pad of the seat cushion is pushed up or is hardened to prevent the waist of the occupant from moving forward.

In this exemplary embodiment of the present invention, the mesh webbing 24 of the tube 20 is made of a knit fabric that can freely increase its diameter, but does not stretch in the longitudinal direction. For this reason, when the diameter of the mesh webbing 24 is increased by the inflation of the bag 22, the mesh webbing 24 is shortened, and the tensioning member 36 is pulled. Consequently, the wire 42 is pulled, the lap anchor 44 is pulled down, and the seat belt 46 is pretensioned and is brought into tight contact with the body of the occupant.

Figure 3A:
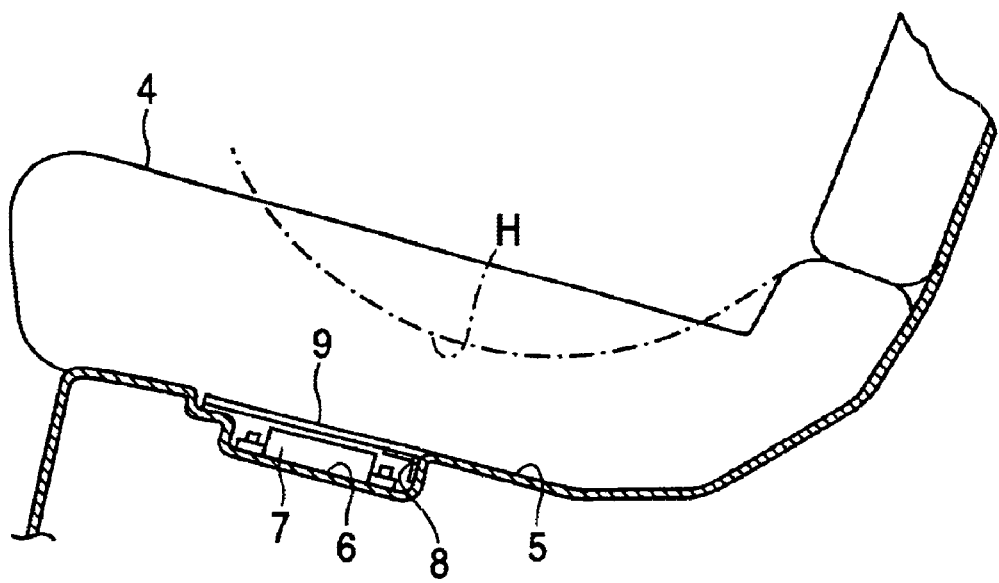
FIGS. 3(a) and 3(b) are structural views showing a conventional art.
Figure 3B:
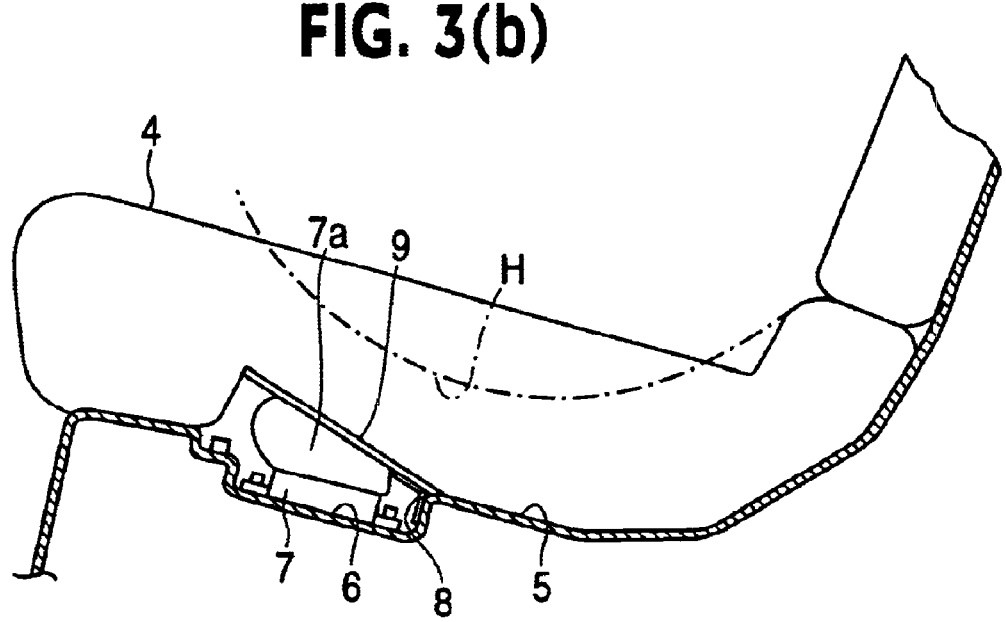

In this embodiment, since the cover 50 tapers toward the top, the upper surface 50a of the cover 50 locally and strongly pushes up the front lower surface of the cushion pad, the front of the cushion pad is locally and strongly pushed up or is locally and considerably hardened, so that the waist of the occupant is prevented from moving forward. Moreover, since the cover 50 tapers toward the top, it can be pushed up with a force smaller than when the cover shown in FIGS. 3(a) and 3(b) is pushed up, and a low-power inflator can be adopted as the inflator 34.

Since the upper surface 50a of the cover 50 is flat, even when it presses the lower surface of the cushion pad hard, the cushion pad will not be cracked, and there is no need to exchange the cushion pad during the repair after a collision. Therefore, repair cost can be reduced or avoided.

In addition, in this embodiment, the lap belt 46 is pretensioned, and a part of the occupant between the waist and the thigh is pulled down. Therefore, the part is sufficiently retained by the synergistic effect obtained by being clamped between the lap belt 46 and front of the cushion pad that is pushed up or is hardened.

In this embodiment, the tube 20 and the pretensioning cylinder mechanism are inflated or driven by the common inflator 34, and therefore, the mechanism is simplified.

Figure 4A:
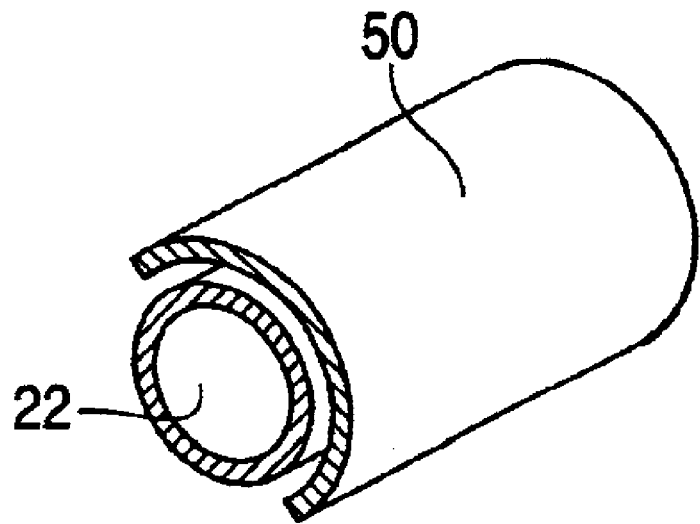
FIGS. 4(a) and 4(b) are perspective views showing alternative embodiments of a cover for the bag shown in FIGS. 1(a) and 1(b).
Figure 4B:
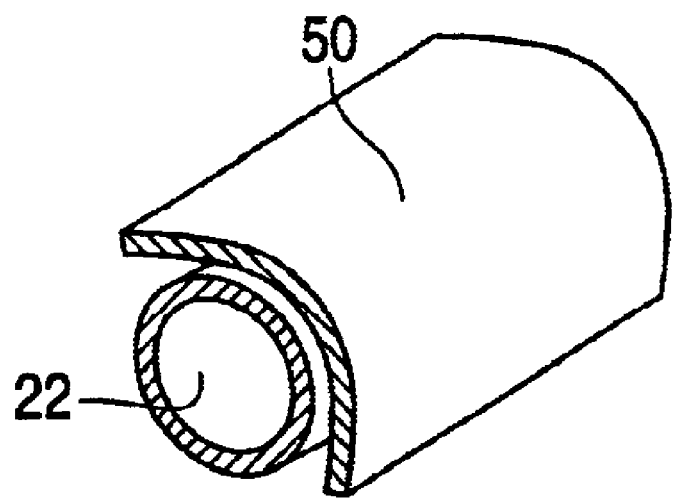

The above embodiment is exemplary of the present invention, and the present invention may include embodiments other than the illustrated embodiment. For example, while the cover 50 is trapezoidal in longitudinal cross section along the forward/rearward direction of the seat in the above embodiment, it may dome shaped in cross-section. For example, the cover may be semi-circular or semi-elliptical as shown in FIGS. 4(a) an 4(b) respectively, or may have a similar shape.

According to the present invention, when the lap anchor is pulled down, a buckle may be pulled down.

As described above, in the occupant protecting device of the present invention in which the bag placed at the front of the seat cushion is inflated to push up the cover, and the front of the seat cushion is thereby pushed up or is hardened in order to prevent the forward movement of the waist of the occupant, the front of the seat cushion can be locally pushed up hard or can be sufficiently hardened even with a low-power gas generator.

The present invention also makes it possible to reduce the cost of repairing the seat cushion after a collision.

The priority application, Japanese Patent Application, Number 2002-163190, filed Jun. 4, 2002 is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A device for protecting an occupant of a vehicle comprising:

a seat having a seating surface and a seat back;

an inflatable bag placed under the seating surface; and a cover overlying the bag and configured to be pushed upward by the bag when the bag is inflated;

wherein the cover has a width measured along a line extending in a forward direction of the seat substantially parallel to the seating surface and wherein the cover is configured so that a measurement of the width of the cover increases as the distance of the line from the seating surface increases.

2. The device of claim 1, wherein the cover has a substantially trapezoidal cross-section.

3. The device of claim 1, wherein the cross-section of the cover taken through a plane extending parallel to the forward direction of the seat is dome-shaped.

4. The device of claim 3 wherein the cross-section is substantially semi-circular.

5. The device of claim 3, wherein the cross-section is a substantially semi-elliptical cross-section.

6. A device for protecting an occupant of a vehicle comprising:

a seat having a seating surface and a seat back;

an inflatable bag placed under the seating surface; and a cover overlying the bag and configured to be pushed upward by the bag when the bag is inflated;

wherein the cover is tapered away from the seating surface, and wherein the cover has a top and a bottom, the bottom of the cover having an opening facing away from the seating surface, and the top of the cover comprises a flat planar surface.

7. The device of claim 6, wherein the top of the cover contacts a cushion located under the seating surface.

8. A device for protecting an occupant of a vehicle comprising:

a seat having a seating surface and seat back;

an inflated bag placed under the seating surface; and a cover overlying the bag and configured to be pushed upward by the bag when the bag is inflated;

wherein the cover includes a plurality of planar surfaces and wherein two of the planar surfaces are inclined away from the seating surface in opposite directions.

9. The device of claim 8, wherein one of the planar surfaces is positioned between the two inclined surfaces.

10. The device of claim 8, wherein the cover has a width measured along a line extending in a forward direction of the seat substantially parallel to the seating surface and wherein the two inclined surfaces are positioned so that a measurement of the width of the cover increases as the distance of the line from the seating surface increases.

* * * * *